United States Patent [19]

Chai et al.

[11] Patent Number: 5,225,661
[45] Date of Patent: * Jul. 6, 1993

[54] BASIC METAL CORED ELECTRODE

[75] Inventors: Chang-Shung Chai, Highland Heights; David A. Fink, University Heights; John Gonzalez, Willoughby, all of Ohio

[73] Assignee: The Lincoln Electric Company, Cleveland, Ohio

[ * ] Notice: The portion of the term of this patent subsequent to Mar. 26, 2008 has been disclaimed.

[21] Appl. No.: 806,777

[22] Filed: Dec. 12, 1991

Related U.S. Application Data

[60] Continuation of Ser. No. 608,300. Nov. 2, 1990, abandoned, which is a division of Ser. No. 405,727, Sep. 11, 1989, Pat. No. 5,003,155.

[51] Int. Cl.⁵ .............................................. B23K 35/22
[52] U.S. Cl. ...................... 219/145.22; 219/137 WM; 219/146.24
[58] Field of Search ............... 219/145.22, 146.22, 219/146.24, 146.3, 146.52

[56] References Cited

U.S. PATENT DOCUMENTS

| | | | |
|---|---|---|---|
| 3,318,729 | 5/1967 | Siegle et al. | 219/145.22 |
| 3,392,263 | 7/1968 | Tichelaar et al. | 219/146 |
| 3,539,765 | 11/1970 | Duttera et al. | 219/146.52 |
| 3,868,487 | 2/1975 | Ito | 219/73 |
| 3,999,036 | 12/1976 | Muratov et al. | 219/145.22 |
| 4,071,734 | 1/1978 | Zarechinsky | 219/146.31 |
| 4,432,937 | 2/1984 | Kuwayama et al. | 420/513 |
| 4,465,921 | 8/1984 | Sakai et al. | 219/146.24 |

FOREIGN PATENT DOCUMENTS

| | | |
|---|---|---|
| 289357 | 11/1966 | Australia . |
| 407227 | 4/1969 | Australia . |
| 414173 | 5/1969 | Australia . |
| 423107 | 6/1969 | Australia . |
| 416808 | 12/1970 | Australia . |
| 439774 | 1/1972 | Australia . |
| 451653 | 4/1972 | Australia . |
| 484159 | 7/1975 | Australia . |
| 27965/77 | 12/1979 | Australia . |
| 0417546 | 8/1990 | European Pat. Off. . |
| 1190597 | 4/1965 | Fed. Rep. of Germany . |

OTHER PUBLICATIONS

Brady et al, "Materials Handbook", 1977, pp. 313-314.
Article "A Fluoroplastic Material in flux-cored strip to reduce the hydrogen content of deposited metal" Author: V V Chigareu and A R Ostroushko, Magazine: Avt. Svarka, 1985, No. 1, pp. 45-47.

Primary Examiner—Clifford C. Shaw
Attorney, Agent, or Firm—Body, Vickers & Daniels

[57] ABSTRACT

A consumable welding element for arc welding comprising a steel sheath surrounding a compacted core containing metal alloying powders and an essentially 100% basic compound in an amount less than about 1.60% of the total weight of said element. The basic compound is calcium fluoride powder which is preferably in the range of about 0.1% to about 0.9% calcium fluoride powder by total weight of the element. As another feature the core of the element contains a specific agent for decreasing the amount of diffusible hydrogen in the weld metal. This new element may be a filler metal for TIG welding; however, it is preferably a consumable electrode for MIG welding.

22 Claims, 4 Drawing Sheets

BASIC METAL CORED ELECTRODE

This is a continuation of Ser. No. 07/608,300 filed Nov. 2, 1990, now abandoned, which is a division of Ser. No. 07/405,727 filed Sep. 11, 1989, now U.S. Pat. No. 5,003,5155.

The present relates to the art of consumable welding elements such as filler metal and electrodes of the consumable type employed in arc welding and more particularly to a basic, metal cored electrode.

BACKGROUND OF INVENTION

The present invention relates to a consumable welding element which can be used as filler metal for TIG welding or as the consumable electrode in MIG welding; however, it has more applicability to MIG welding of high strength metals of the type demanded in certain military and industrial applications and it will be discussed with respect to that application. This discussion is applicable to all uses of the invention.

In the art of electric arc welding it is common practice to use a MIG process wherein a metal wire is advanced toward the workpiece while an electric arc is created between the wire, referred to as a consumable electrode, and the workpiece for the purpose of melting the end of the wire or electrode to deposit metal onto the workpiece. Such MIG welding process involved highly developed and sophisticated technology in the area of the precise composition of the electrode which is consumed in the welding process. The composition of the electrode, the fluxing system, the type of electrical current, the shielding gas and other factors are adjusted and manipulated to obtain the desired welding objectives. One primary objective of any arc welding process is to obtain a high deposition rate which for the MIG process is usually indicated as a rate exceeding about 5 lbs/hr for welding in the vertical plane. The resulting weld metal must have a good bead formation, low amounts of slag formed over the weld bead, and other physical characteristics, which decrease the amount of labor needed to clean the resulting welded joint after the welding process. In addition, the weld metal, or bead, of the joint itself must have physical properties such as low cracking tendencies and high impact strength, sometimes measured as the Charpy impact value. In addition, it is desirable to be able to employ the welding electrode in not only a down hand position, but also welding out-of-position. All of these objectives have been the subject of substantial patented art. Details of electrode compositions need not be repeated for a person skilled in the art to understand the present invention.

As the yield strength of the workpiece metal increases to high strength levels, such as military specs HY-80, HY-100 and, even HY-130, serious problems have been experienced in obtaining low cracking and high impact strength while maintaining the ability to weld out of position at high deposition rates. When welding these high yield strength steels such as steels exceeding HY-80 (80,000 psi), the consumable electrode has heretofore normally taken the form of a solid metal wire with an out of position diameter generally about 0.045 inches and with the down hand diameter generally about 0.062 inches. Welding of high yield strength steels including and exceeding over HY-100 has been extremely difficult even with such solid MIG wire.

The object of the present invention is to provide a consumable electrode for MIG welding or filler wire for TIG welding, which can be used for high strength steels over HY-80 and ideally for steels with strength as high as HY-130. Efforts to accomplish this objective have, in the past, involved use of the solid wire with adjustments of the alloying composition together with preheating the workpiece. These efforts have been less than successful. In the welding art, there is always a tremendous impetus to improve the welding electrode for the purposes of increasing the ease at which high strength steel is welded with low cracking and high impact results. This is the objective accomplished by the present invention.

Attempts to use MIG welding for high yield strength steels (over 80,000 psi) with high deposition rates and high quality welding have, as explained, involved the use of solid wire. Such wire does have the capabilities of creating a relatively low diffusible hydrogen level in the weld metal; however, when a flux is required with the electrode, the diffusible hydrogen in the weld metal increases. This increases the tendency for the weld metal to crack upon solidification. In view of the tendency of fluxing compounds to increase the diffusible hydrogen in the weld metal, it has been generally perceived that metal cored electrodes for the MIG process would not be satisfactory for high strength applications such as those previously mentioned. The processing and composition of the core materials also increased the amount of oxygen in the weld metal. Thus, when extremely high yield strength is employed, such as in the hull of ships, the military specifications have generally required the use of solid welding wire. This limited the out-of-position deposition rate to about 6 lbs/hr, which was obtainable only by elaborate electrical pulsing techniques. Irrespective of that, the military has not been satisfied with such solid welding wire for application above yield strengths of HY-100 steel. If flux cored electrode were employed, diffusible hydrogen of a higher level was experienced in the weld metal which increased the tendency of cracking. The use of solid welding wire for welding high yield strength steels became the normal and only acceptable practice. To increase the mechanical properties of the weld joint, the base metal was often heated preparatory to welding. Such solid wire electrode material also was compelled to contain the alloying materials in precise percentages. Consequently, accurate control over the alloying composition of the solid wire was extremely critical. This is a difficult metallurgical task.

In the welding industry, cored electrodes are quite commonly employed for MIG welding. Such cored electrode reduce the criticality of the alloying metal forming the tubular component of the electrode. This is accomplished by incorporating the alloying metals within the core in very precise proportions to obtain the desired alloying characteristics and percentages in the resulting weld metal. Although the use of a cored electrode with a metal powder core for controlling the composition of the weld metal does enhance the ability to control the actual composition of the weld metal, a metal cored electrode has a tendency to introduce a substantial amount of oxygen into the weld metal and cause a decrease in the impact strength of the weld metal. In addition, fluxing ingredients are required when using metal cored electrode in critical high strength applications. This results in higher diffusible hydrogen in the weld metal than was experienced in use of solid wire. In addition, such metal cored electrode material was somewhat sensitive to differences in electrical stick-out during the welding process. This disadvantage was attributed to moisture in the electrode core and seam and moisture in the shielding gas around the electrode. Thus, the use of metal cored electrodes with all of their advantages with respect to controlling the actual composition of the weld metal had serious deficiencies and were not employed for solving the problem of welding high yield strength steel of the type experienced in the ship building industry. In addition, cored electrodes were not generally employed in pulsed welding processes, such as employed in out of position welding of high strength steels.

Through the years the technology associated with welding high yield strength steel (over 80,000 psi) has involved a sophisticated MIG welding process using a solid welding wire. Suggestions to employ a metal cored electrode have met with a lack of acceptance. The use of metal powder alloys in the core of the electrode solved the criticality difficulties associated with precise percentages required in the weld metal; however, use of such a cored electrode increased the difficulties experienced with hydrogen and oxygen in the weld metal of the resulting joint. These disadvantages made use of metal cored electrode for high strength steel inappropriate. In view of the disadvantages involved in use of metal cored electrodes for MIG welding of high yield steel, it is not surprising that the use of flux cored electrodes has been limited for high yield strength welding. Problems recognized for metal cored electrodes were present in flux cored electrodes. However, flux cored electrodes had still additional limitations.

A common flux cored electrode is one having a titanium dioxide fluxing system formed as powders in the core and surrounded by a low carbon steel sheath. Such flux cored electrodes provide good welding at high deposition rates, up to 8 lbs/hr, can be used out-of-position. However, such electrodes result in a higher level of diffusible hydrogen than can be employed in even HY-80 steel. In addition, the oxygen produces a relatively low Charpy strength. Consequently, the use of mild steel flux cored electrode employing the normal titanium dioxide fluxing system produces good welding characteristics, with high deposition rates and relatively high acceptance by the operator; however, the resulting weld metal has oxygen and hydrogen at a level which is not acceptable, for most high yield strength steels. Due to the extremely high quality and high deposition rates obtainable by other flux cored electrodes, it has been suggested to use a basic flux cored electrode employing such basic compounds as calcium fluoride. These electrodes do produce good impact strength, since the fluorine has a tendency to scavenge the oxygen from the weld metal; however, such basic flux cored electrodes can not be used satisfactory for out of position welding. Basic flux cored electrodes are not generally acceptable to the welder since their use is generally limited to down hand welding. Consequently, basic flux cored electrodes have not been employed for this type high yield strength welding.

In summary, metal cored electrodes, flux cored electrodes and basic flux cored electrodes have not heretofore been used acceptably in MIG welding of high yield strength steels, i.e. steels greater than about 80,000 psi (HY-80). Only solid wire electrode has been widely accepted in the military and industry for this high yield strength mechanized welding application.

INVENTION

The present invention relates to a welding element, such as an electrode or filler wire, which element can be employed for welding high yield strength steels, exceeding HY-100. Indeed, the electrode is applicable for HY-130 steel. This improved electrode is a basic, metal cored electrode which does not have the disadvantages of basic flux cored electrodes, as explained above, which disadvantages resulted in universal use of solid metal wire for the MIG welding process when welding high yield strength steels exceeding HY-80. The present invention relates to a basic, metal cored electrode which can be used for out of position welding, obtains a deposition rate substantially greater than 5.0 lbs/hr, requires a fewer number of passes and produces a resulting weld bead which essentially duplicates a solid wire weld bead, wherein only minor islands of slag form along the surface of the bead.

In accordance with the present invention there is provided a basic, metal cored electrode which can be employed for MIG welding of high yield strength steels exceeding 100,000 psi or a cored filler wire for the same purpose. In accordance with the present invention there is provided a consumable arc welding electrode or welding element comprising a steel sheath surrounding a compacted core containing metal alloying powder. This core also includes an essentially 100% basic compound in an amount less than about 1.6% of the total weight of the element, i.e. the electrode. The metal alloying powder employs standard technology to determine the alloying composition of the resulting weld bead. The basic compound provides a single ingredient fluxing agent while reducing the oxygen in the weld metal to a level less than about 0.04% of the weld metal. In accordance with the invention, the 100% basic compound is calcium fluoride powder.

In accordance with another aspect of the present invention, the calcium fluoride powder is contained within the core at an amount between about 0.1% to about 0.9% of the total weight of the electrode. By having this low percentage of fluxing ingredients, namely calcium fluoride powder, the previously experienced welding problems with flux cored electrodes is overcome, while the calcium fluoride controls the amount of oxygen in the resulting weld metal.

In accordance with still another aspect of the invention, the basic, metal cored electrode includes a small amount of an agent for reducing the amount of diffusible hydrogen in the weld metal. This agent is selected from the group consisting of a polymer containing fluorine, elemental zinc powder, a zinc alloy powder, and combinations of these agents. The polymer containing fluorine has a melting point less than about 1,000° F. so that it may be incorporated in the core material in particulate form and retain its composition during forming and drawing of the electrode. This agent releases fluorine for the purpose of capturing diffusible hydrogen in the weld metal during the arc welding process. The zinc powder can also be incorporated in precise controlled quantities in the core of the electrode. These hydrogen scavenging or reducing agents could not be employed in a solid metal wire electrode. The polymer would be consumed in any melting or alloying process for producing a solid wire. Zinc powder could stratify or lose its effectiveness.

In accordance with the primary aspect of the present invention, the basic metal cored electrode includes, as the single ingredient flux agent, calcium fluoride powder in the core in addition to the powder employed for hydrogen scavenging, such as a polymer containing fluorine or zinc powder. Metal alloying powder is also incorporated in the core with the single basic ingredient and the hydrogen scavenging agent. The core is surrounded by a low carbon sheath which can be drawn into an electrode less than about 0.100 inches in diameter. Of course, it is conceivable that the sheath of the electrode could be formed in an electric alloying furnace to avoid the necessity for alloying metal powder in the core of a consumable electrode. However, an 1, important feature of the present invention is the implementation of a basic metal cored electrode employing a single ingredient which is 100% and generally inert, together with a hydrogen scavenging agent. Whether the alloying metal is in an accurately controlled sheath metal or is controlled by metal alloying powder in the core, is not critical to this important feature. The alloying concepts technology and results can be modified in accordance with normal skill of the art. However, a distinct advantage results from employing the alloying metals in the core. Thus, the invention involves a basic metal cored electrode which can replace a solid wire getting the same results, but with the advantage of decreasing the oxygen in the weld metal and reducing the amount of diffusible hydrogen. This is a new concept and has never been done in the welding art. By this invention, MIG welding of extremely high strength steels has been accomplished, even in out of position welding.

The basic, metal cored electrode of the invention is a development contrary to the customary wisdom in the arc welding field for MIG welding of high yield strength steel. Due to the limitation of cored electrodes, the prior welding technology involved the use of solid metal wire which in turn had the disadvantages previously described. It was not satisfactory for steel with a yield strength over 80,000 psi. The invention involves the use of a 100% basic compound which is inert, within a core of an electrode. Calcium fluoride powder is employed for this purpose. In the past, when using calcium fluoride powder in the core of an electrode, the calcium fluoride is present in relatively high percentages to balance the normal acidic flux constituents. Since the calcium fluoride percentage was relatively high, out-of-position welding was difficult. Thus, the art did not teach the use of calcium fluoride as an ingredient in a successful cored electrode for use in high yield strength out-of-position welding applications. In accordance with the invention, calcium fluoride powder is employed; however, it is used in a novel manner. The calcium fluoride is used in the invention as the single fluxing ingredient in the core of the electrode. There is no fluxing system, such as the normal $TiO_2$ system or a basic flux system. The term "system" means two or more fluxing ingredients which react to create the fluxing action. The novel concept of the invention is the calcium fluoride coacting with no other fluxing agent, but performing as the fluxing agent by itself. In accordance with the invention, the amount of calcium fluoride is reduced to a level below about 1.6% by weight of the total electrode and preferably below 0.9% by weight. At this low amount of calcium fluoride, the fluxing action is accomplished by the calcium fluoride itself. There is no fluxing system. By reducing the calcium fluoride powder to a level below 1.60% and preferably below 0.9% of the electrode weight, the calcium fluoride controls the oxygen in the weld metal without producing the poor welding operation and the inability to weld out-of-position normally associated with a flux cored electrode having a larger volume of calcium fluoride. The calcium fluoride can be reduced even below the aforementioned upper limit (1.60%) without affecting the welding operation; however, as the lower limit of calcium fluoride approaches 0.2%, the amount of oxygen in the weld metal increases to a level which reduces the impact strength of a high yield strength steel for which the electrode is especially developed. Since the calcium fluoride is 100% basic and inert, it produces a single flux agent or ingredient for the cored electrode. Since the calcium fluoride is limited at its upper percentage to create the improved electrode, the fluorine available from the calcium fluoride for use in the weld metal is limited. Since fluorine is an agent for reducing the diffusible hydrogen, which causes cracking associated with most efforts to weld high yield strength steel, the present invention, in accordance with another aspect, incorporates as an additional ingredient, a hydrogen reducing agent. This agent, is novel and decreases the amount of diffusible hydrogen in the weld metal. Two primary hydrogen reducing agents which form a part of this invention are a polymer containing fluorine and elemental zinc powder.

As so far described, the invention employs calcium fluoride powder in a relatively low amount within a precise range, together with a small amount of an appropriate hydrogen reducing agent, such as a polymer containing fluorine or elemental zinc powder.

In its practical implementation, the invention is a basic metal cored electrode; therefore, alloying metals for the weld metal are in powder form and compressed in the core. Of course, it is conceivable that the alloying materials could be incorporated into the surrounding sheath of the electrode if metallurgical accuracy can be obtained in the alloying of the sheath steel. In accordance with the preferred embodiment of the invention and in the most practical embodiment of the invention, a low carbon or low alloy steel sheath is employed for surrounding the core. The alloying metals are incorporated as powder in the core. Consequently, the invention is referred to as a basic, metal cored electrode. The electrode is drawn into the desired size which, preferably, is a cylinder less than 0.100 inches in diameter. This drawn, cored wire, constructed in accordance with the present invention, is used for MIG welding to obtain all of the advantages of a cored electrode together with the advantages of a solid wire electrode. By using a single basic constituent in low quantities, within the core together with a novel hydrogen reducing agent, oxygen and hydrogen in the weld metal are reduced. The welding electrode can be employed for welding high yield strength steel, such as steel with minimum yield strength of 100,000 psi (HY-100) and, even 130,000 psi (HY-130) In accordance with the invention, this basic metal cored electrode can be used to weld out-of-position since the calcium fluoride is at a controlled, limited maximum level, which is less than 1.60%, and this calcium fluoride constitutes the only fluxing constituent within or on the electrode.

By employing the present invention, calcium fluoride is the single fluxing ingredient within the core and the resulting electrode welds essentially in the same fashion as solid MIG wire, such as out-of-position welding and/or pulse welding. The advantages of a cored electrode are retained with the advantages of a solid wire electrode.

In the past, the use of a metal cored electrode produced higher levels of oxygen. This oxygen, in the invention, is reduced by inclusion of calcium fluoride particles or powder in the core; however, the level of inclusion of calcium fluoride is restricted to small amounts less than 1.60% so that the difficulties previously experienced in using calcium fluoride, i.e. inability to pulse weld out-of-position, is not a detrimental characteristic of the present invention. Reduction of the calcium fluoride in the core as used in the present invention is novel. One aspect of the invention was based upon the recognition that higher levels of calcium fluoride as used in a basic flux system were not required, if the flux was only calcium fluoride. In this manner, a basic flux is created by the calcium fluoride. By removing the other constituent of the basic flux system, calcium fluoride can be used in smaller amounts. By reducing the amount of calcium fluoride, the welding characteristics of the electrode are made acceptable. Thus, the invention involves controlling the chemistry of the calcium fluoride to employ only enough calcium fluoride to scavenge the oxygen in the weld metal. The calcium fluoride is not one of several constituents in a basic flux system. The calcium fluoride of the invention forms the total basic flux constituent. By such control of the calcium fluoride chemistry, a basic metal cored electrode is produced which has better welding characteristics than a solid wire electrode. The calcium fluoride is of sufficient amount to control the oxygen in the weld metal to minimize any decrease it would otherwise cause in the impact strength of the resulting weld. Of course, alloy metals in the core or in the metal of the sheath surrounding the core can be incorporated for affecting the Charpy notch strength, without departing from the present invention.

Since additional amounts of calcium fluoride in the electrode are not needed to offset other fluxing constituents of a total multiple component flux system, the electrode is useful in pulse welding out-of-position to the same extent as a solid MIG wire electrode. Thus, a basic cored electrode is provided with a single fluxing ingredient which is 100% basic and inert. Such single ingredient fluxing is distinguished from other fluxing systems of the type including titanium dioxide which is detrimental to the notch toughness of the weld metal. Use of a conventionally fluxed electrode is not applicable for welding high yield strength steel of the type now employed by the military with steel that approaches HY-100 or greater.

In the past, there have been metal cored electrodes and basic flux cored electrodes. These two electrodes were never considered as replacements for solid wire when employing MIG welding of high yield strength steel, such as used in naval vessels, military and commercial. Basic flux cored electrodes, as previously mentioned, are not applicable for out-of-position welding. They have lower operator appeal and low deposition rates, less than 5.0 lbs/hr. The present invention relates to a cored electrode which is a combination of metal and basic which is applicable for the purposes described in this application. The non-metallic ingredients in the core are limited to calcium fluoride and the polymer containing fluorine hydrogen removing agent, if selected. There are no other non-metallic materials forming a total fluxing system as is normal in the industry.

It has been found that a basic, metal cored electrode, as so far described and constructed in accordance with the present invention, is highly advantageous for welding high yield strength steel and can be substituted for solid wire electrode material. However, to produce a superior cored electrode, the present invention also envisions a constituent for reducing the diffusible hydrogen of the weld metal. Such hydrogen is believed to be derived from moisture entering the seam of the sheath surrounding the core by capillary action or otherwise. Tendency for cracking increases with increases in the yield strength of the base metal being welded. Thus, as the strength increases, the amount of hydrogen which can be tolerated in the weld metal decreases. Hydrogen enters the weld metal from contaminants within the core, from lubricants placed on the electrode and from drawing compounds used in processing the electrode and from other sources. The military specifications require less than 2 ml/100 g for welding at room temperature for steel within the range of 82,000-88,000 psi. To attempt to accomplish this with the solid wire, the wire is cleaned after processing. This cleaning reduces the ability to feed the wire and still meet these requirements. Heating of the base metals has a tendency to drive moisture from the base metal surface. Thus, heating before welding is another way of limiting hydrogen in the weld metal. To reduce hydrogen, some companies make seamless tubes for the cored electrodes to limit moisture entering through the seam of the tube into the core material. However, no matter what procedures are used, hydrogen is still present in the weld metal. The hydrogen originates from the moisture in the shielding gas and from hydrogen on the surface or entrapped in the joint between the base metal structures being welded. Other sources of hydrogen exist to complicate any physical procedure for elimination of the small amounts which can cause problems in high strength steels, i.e. greater than about 80,000 psi. Thus, the present invention is directed toward a concept of accepting the existence of unwanted, minute quantities of hydrogen and removing the minute quantities by a novel formulation of the electrode. Since the amount of calcium fluoride is relatively low, only a small amount of fluorine is available t reduce the diffusible hydrogen. However, the level of hydrogen must be below 2 ppm for high yield strength steel, such as HY-100, especially when welded at room temperature. The present invention can reach this goal by using calcium fluoride in the limited amount. However, it is quite desirable to reduce the hydrogen even below the 2 ppm limit recognized by military specifications as a requirement for high yield strength welding. In accordance with the invention, a hydrogen reducing agent is employed to reduce the detrimental diffusible hydrogen. This agent is a polymer containing fluorine such as a fluocarbon. This agent evolves fluorine to combine with the diffusible hydrogen. It is solid at the temperatures used in processing electrodes. This can be accomplished by using a polymer capable of withstanding a temperature of about 1,000° F. The agent of the polymer type must be able to be particulated into fine powder for the purposes of mixing with metal powder and calcium fluoride powder. The polymer type agent must be deliquiescent, and non-hygroscopic and otherwise inert. Of course, there could be no hydrogen atoms nor any nitrogen atoms in the polymer. In the preferred embodiment the polymer type agent described above, is employed with calcium fluoride powder to produce the system that is combined with the metal alloying powders in the core of the electrode. The fluorine from the small amount of calcium fluoride assists in removing hydrogen. The polymer containing fluorine reduces the amount of hydrogen even further and results in substantially less than 2 ppm of hydrogen in the weld metal. As is known, hydrogen in the monatomic state is a primary deleterious constituent causing cracking in the weld metal. Combining of hydrogen with fluorine reduces this type of free hydrogen. In addition, if hydrogen combines with itself to form a hydrogen molecule, it does not affect seriously the cracking characteristics of the weld metal. Thus, fluorine reduces the cracking tendency of the weld metal. This substantial decrease of the diffusible hydrogen is even more beneficial when notch toughness is a problem such as in HY-130 steel.

In accordance with another aspect of the invention, zinc metal powder is also employed as the agent for reducing the amount of diffusible hydrogen in the weld metal. Although the system for accomplishing this reduction is not known, it is believed that it forms pockets in which diffusible hydrogen accumulates to form molecular hydrogen. Since zinc melts at about 906° C., the metal powder can be combined in the core of the electrode when using standard electrode forming processes. It could not be employed for that purpose in solid wire which is alloyed at substantially higher temperatures.

In summary, two types of agents are preferred for removing hydrogen from the weld metal. These agents are formed as particles and incorporated into the core of the electrode. These two preferred hydrogen reducing agents are a polymer containing fluorine and elemental zinc powder, both of which are unstable at the melting temperature of steel. As discussed previously, cored electrodes in the past have been sensitive to stick out variations with respect to the amount of hydrogen which is found in the weld metal. It has been determined that the two types of hydrogen reducing agents contemplated by the present invention do not have substantial stick out sensitivity and produce essentially the same levels of diffusible hydrogen in the weld metal for normal variations in stick out in a MIG welding process.

In accordance with the invention, a low carbon steel sheath surrounds a core of particulate material which is reduced in diameter to compact the core material with an outer diameter of less than 0.100 inches. Such mild or low alloy steel sheath surrounds a small amount of calcium fluoride powder and a trace of the hydrogen reducing agent preferable a polymer containing fluorine or zinc powder, or combinations thereof. Metal powder is included in the core for the purpose of alloying the resulting weld metal deposited by use of an electrode constructed in accordance with the present invention. By this construction, there is produced a basic metal cored electrode which can replace a standard solid wire for use in MIG welding of high yield strength steel. This has never been done before. The invention can be used for filler wire to TIG welding also.

The primary object of the present invention is o provide a somewhat conventional metal cored electrode with a basic ingredient, such as powdered calcium fluoride. This produces a family of basic metal cored electrodes.

Another object of the present invention is the provision of a basic, metal cored electrode which can be used in a situation wherein lower weld metal oxygen content is demanded. The oxygen content is controlled by the chemistry of the basic ingredient, such as powdered calcium fluoride.

A further object of the present invention is the provision of a cored electrode that can be used in pulse welding out-of-position in a manner heretofore reserved in MIG welding for solid wire electrodes.

Another object of the present invention is the provision of a cored electrode with agents in the core to reduce the diffusible hydrogen in the weld metal.

Still a further object of the present invention is the provision of a basic, metal cored electrode that can be used in high yield strength steel welding applications such as HY-80, HY-100 and HY-130 where hydrogen cracking is more prevalent.

In accordance with still a further object of the present invention is the provision of a cored electrode providing calcium fluoride in the core at a level in the general range of 0.1% to 1.6% by weight of the electrode and preferably in the range of 0.1% to 0.9%. Since the fluorine within the welding arc creates a pinching effect which produces spattering and slag ingredients in the metal cored electrode also deteriorates welding speed in out-of-position pulse welding applications, the limitation of calcium fluoride in an electrode to no more than about 0.9% of the total electrode weight increases the quality of the resulting weld using the present invention.

Yet another object of the present invention is the provision of a cored electrode for use in high yield strength welding wherein a lower oxygen content produces higher impact properties and improves the weld metal microstructures.

Another object of the present invention is the provision of a basic, metal cored electrode for use in high yield strength welding which may employ calcium fluoride or barium fluoride powders or possibly lithium fluoride, sodium fluoride or potassium fluoride powders. In accordance with the preferred embodiment of the invention, calcium fluoride powders are employed.

These and other objects and advantages will become apparent from the following description taken together with the accompanying drawings.

PREFERRED EMBODIMENT

Figure 1:
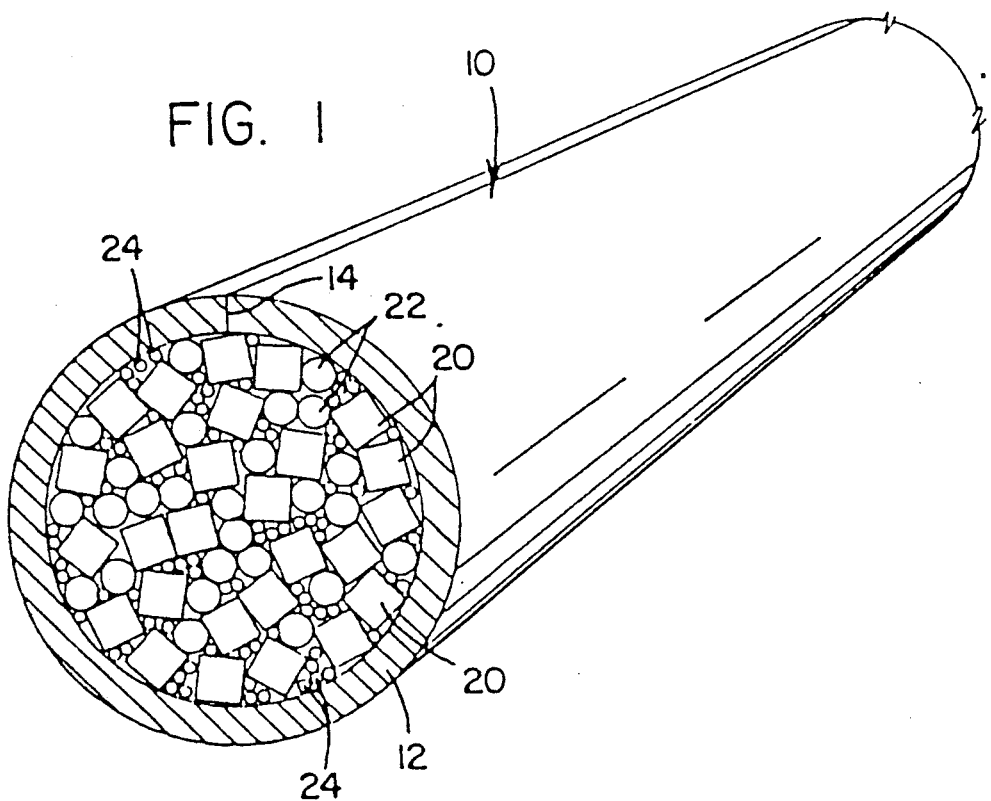
FIG. 1 is a schematic cross sectional view of a basic metal cored electrode constructed in accordance with the present invention.

Referring now to the drawings wherein the showings are for the purpose of illustrating a single example of the present invention. In this example, two plates one inch thick are welded with a shielding gas including 98% argon and 2% oxygen with a heat input of 55-100 kilojoules/inch with a preheat of the plates to a temperature of 250° F. The plates are formed from a high yield strength military steel HY-100. A basic metal cored electrode 10 was provided with an outer low carbon sheath 12 joined together at a seam 14, as schematically illustrated in FIG. 1. This figure shows features of the invention which will be described generally.

The seam 14 of sheath 12 may be overlapping or otherwise formed in accordance with standard practice for making welding rod 10. Within sheath 12 is a core compacted together and formed from particles 20 of alloying material (shown as squares), calcium fluoride particles 22 (shown as large circles) and a small amount of polymer containing fluorine particles 24 (shown as small circles). This core is compacted by drawing electrode 10 to a diameter less than 0.100 inches. In this example, the polymer containing fluorine is 0.16% of the total electrode weight (see FIG. 4). The percentage of total electrode weight for the calcium fluoride particles is 0.5%. The metal alloy particles 20 have a percentage of about 19% of the total weight of the electrode. The remaining weight is the sheath or tube 12. This example produces a satisfactory weld for high yield strength military steel such as HY-100.

Figure 5:
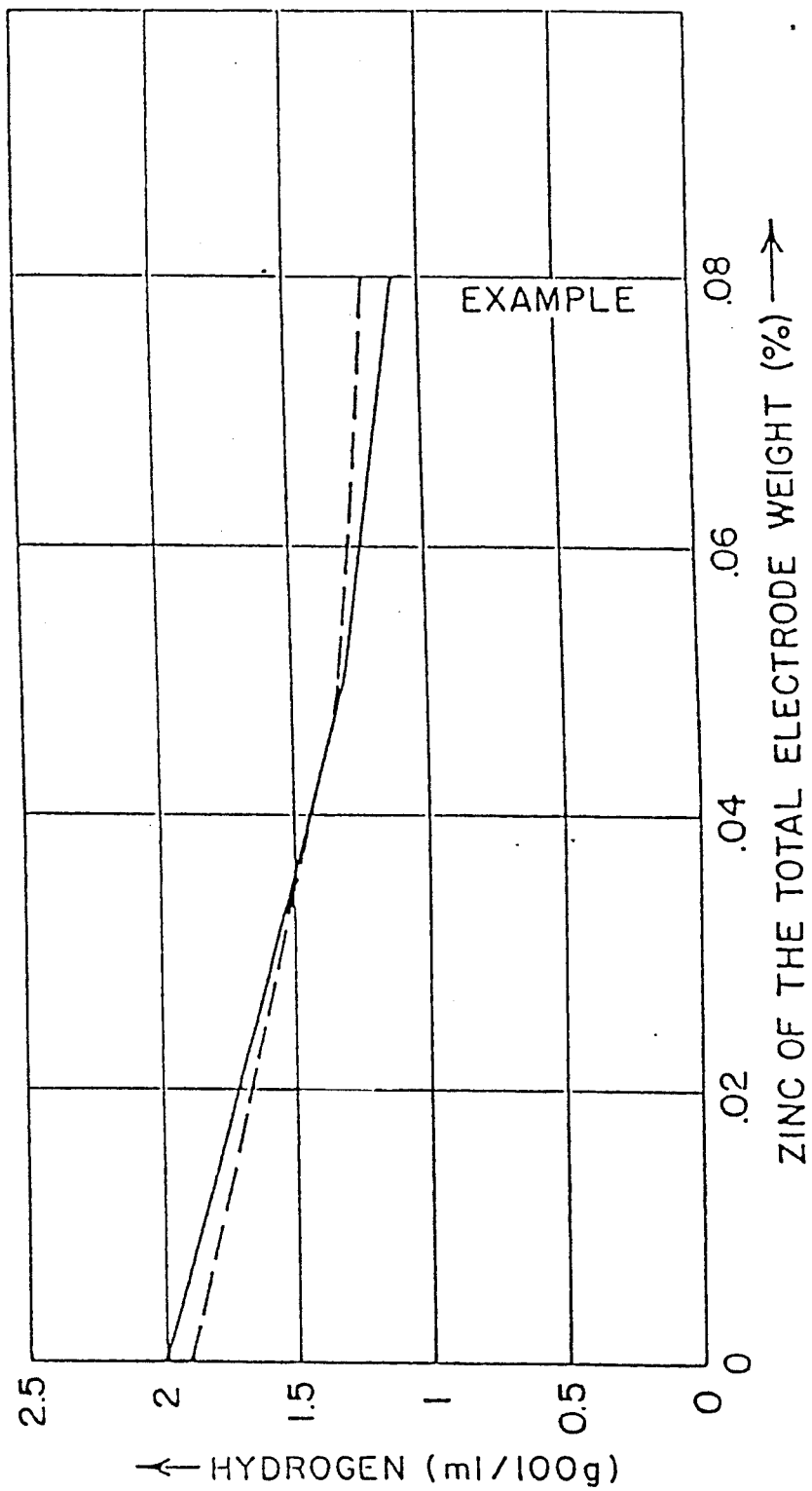

Another example of the present invention is produced wherein particles 24 are formed from zinc powder (see FIG. 5). In this second example, the calcium fluoride is still 0.5% of the total weight of the electrode. Zinc particles are 0.08% of the total weight of the electrode. The alloying powders or particles 20 have a percentage of approximately 19% of the total weight of the electrode. The remaining weight of the electrode is the sheath 12.

Figure 2:
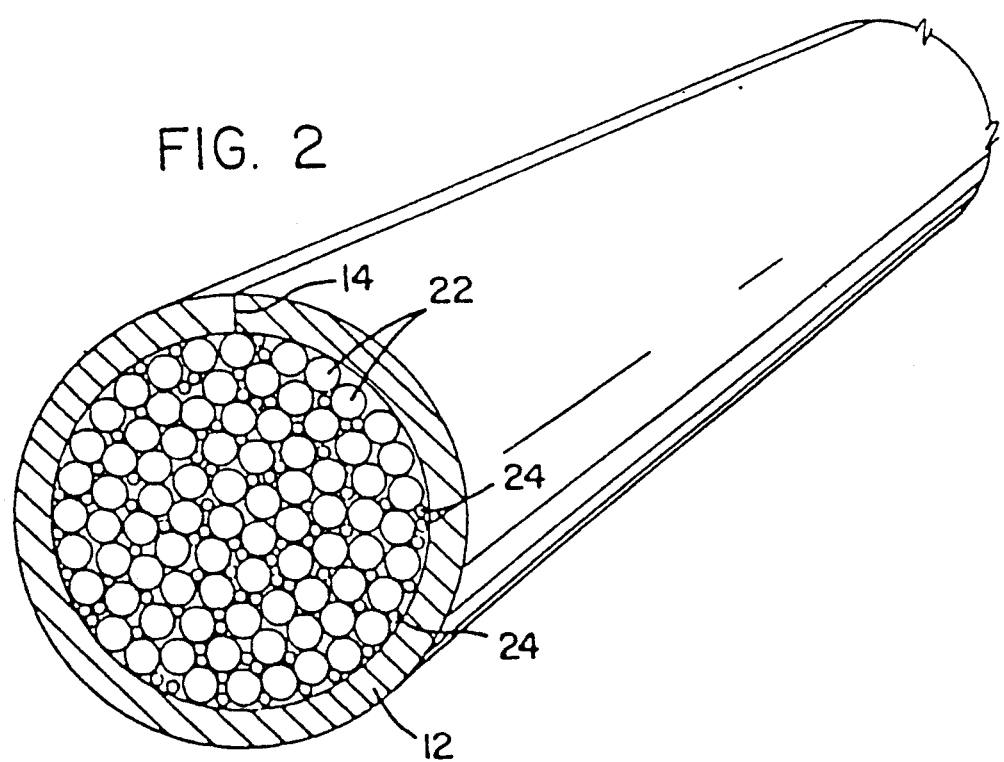
FIG. 2 is a cross sectional view of a modification of the preferred embodiment of the present invention.

FIG. 2 is a modification of the preferred embodiment of the invention wherein the core within sheath 12 includes only the calcium fluoride powder 22 and the hydrogen reducing agent powders 24. In this instance, the metal forming sheath 12 includes the alloying agents. The various compositions of alloying agents is not a part of the present invention and may be adjusted without departing from the present invention which relates only to the concept of an essentially single fluxing ingredient, i.e. calcium fluoride, together with alloying powder in the core with, in the preferred aspect, the addition of a hydrogen reducing agent in the core. As can be seen, this invention is not directed toward concepts and technology related into the selection of the alloying agent for the particular welding operation being performed.

Figure 3:
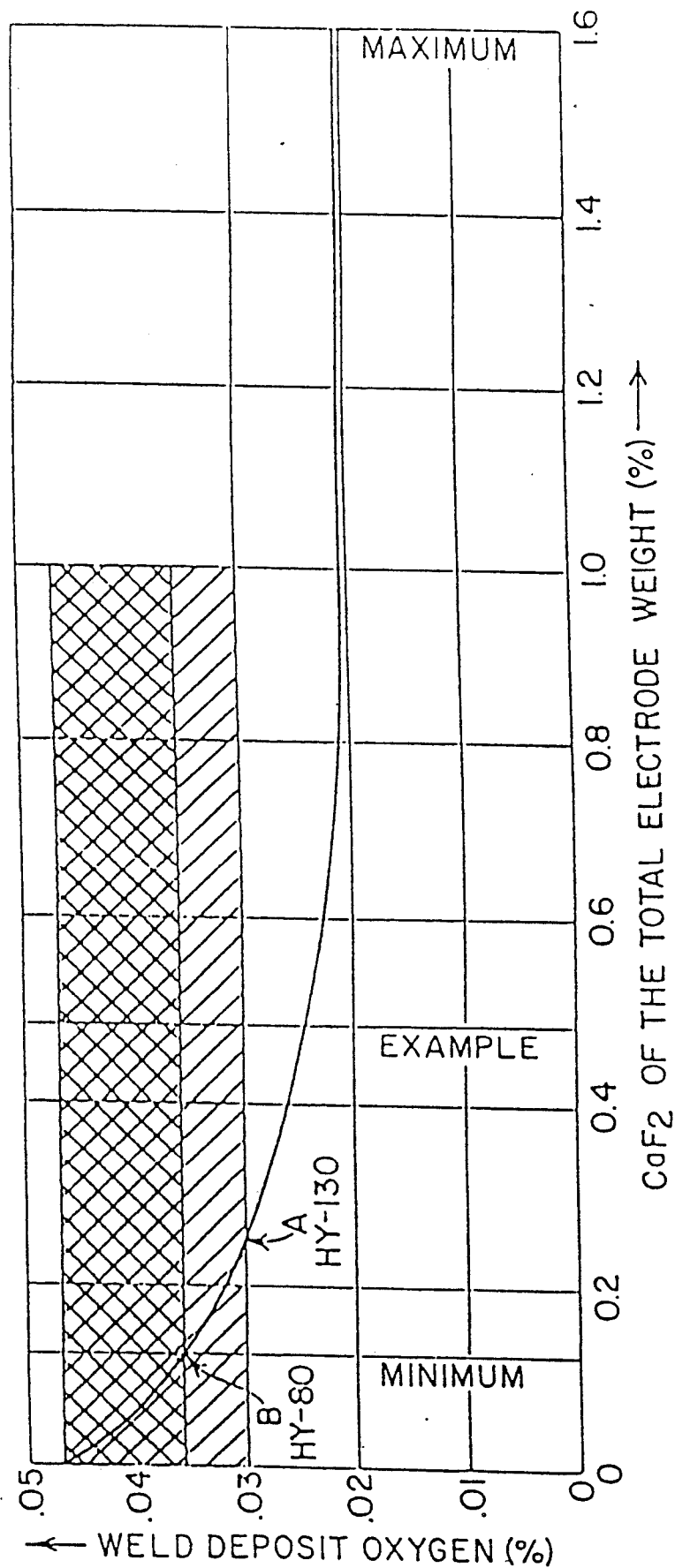
FIG. 3 is a graph illustrating the relationship between the basic composition of the electrode and the weld metal oxygen content.

Referring now to FIG. 3, the calcium fluoride particles within the core are less than about 1.6% of the total weight of the electrode. At 1%, or at a position near that amount calcium fluoride, the welding quality starts that amount calcium fluoride, the welding quality starts reducing its acceptability and a value over about 1.6% would result in a welding electrode not satisfactory for use in welding high yield strength steels in various welding positions. As the calcium fluoride decreases, the amount of oxygen in the weld deposit increases. As the yield strength of the high yield strength steel increases, a lesser amount of oxygen can be contained in the weld metal to meet military specifications and give acceptable impact strength. For high yield strength steel in the higher range, such as HY-130, the amount of included weld metal oxygen must be less than for high strength steel such as HY-80. Thus, the minimum level of calcium fluoride for HY-130 is at position A on the graph. For high strength steel with a lower strength, such as HY-80, the oxygen included in the weld metal can be slightly higher. This concept is illustrated at position B on the graph. Thus, the minimum limit of calcium fluoride varies according to the yield strength of the high yield strength steel to which the invention is specifically applicable. In all instances, the weld metal alloy has a low oxygen content which is required for welding high yield strength steel. The ability to include more oxygen is only illustrated in FIG. 3 for the purpose of describing the invention and showing the minimum limits for the calcium fluoride needed in practicing the present invention.

Figure 4:
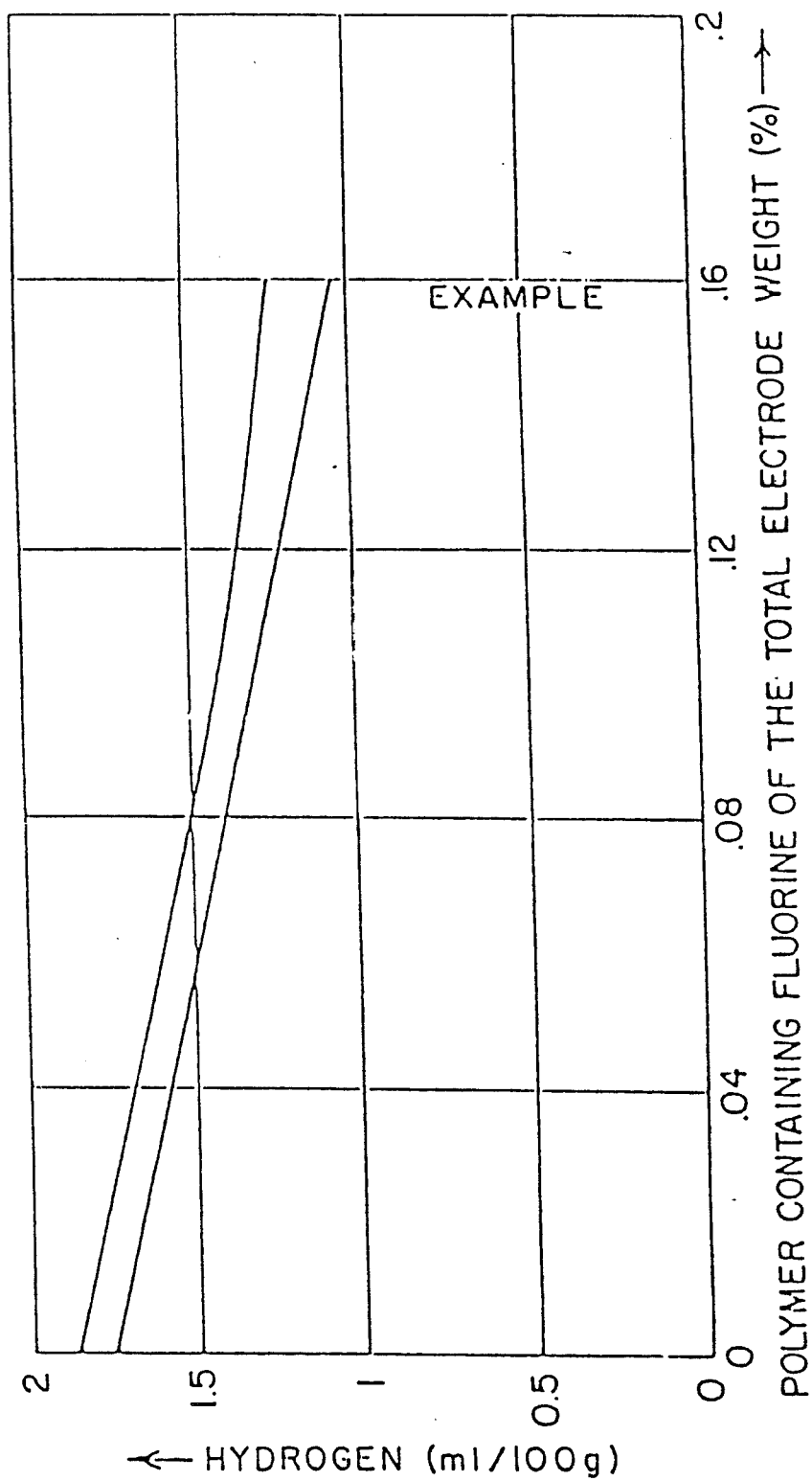
FIG. 4 is a graph showing the relationship between the percentage of a polymer containing fluorine of the total electrode weight and the concentration of diffusible hydrogen in the weld metal; and, FIG. 5 is a graph showing the relationship between the percentage of powdered zinc of the total electrode weight and the concentration of diffusible hydrogen in the weld metal.

Referring now to FIG. 4, in this graph, the percentage of polymer containing fluorine is compared to the diffusible hydrogen found in the weld metal. The value for hydrogen is indicated by the parameter ml/100 g which has a generally direct relationship with ppm. In practice, the high yield strength steels should have diffusible hydrogen less than 2.0 ppm. As can be seen, by incorporating calcium fluoride powder with the metal alloying powders, this objective is reached, even without any hydrogen reducing agent. However, in accordance with an aspect of the invention, a hydrogen reducing agent is incorporated to reduce even further the hydrogen in the weld metal. By including 0.16% of polymer containing fluorine as used in the first example, a small amount of the hydrogen reducing agent drastically reduces the hydrogen of the weld metal. Thus, the preferred embodiment of the invention, and one aspect of the invention, involves the use of such a hydrogen reducing agent to decrease the amount of detrimental diffusible hydrogen within the weld metal. The upper graph in FIG. 4 represents an electrical stick out for $\frac{3}{8}$ inch. The lower graph is for an electrical stick out of $\frac{5}{8}$ inch. As can be seen, the use of this agent to the core of electrode 10 has very small stick out sensitivity as it relates to hydrogen. This is an advantage over other arrangements for minimizing diffusible hydrogen at these low levels.

The lack of stick out sensitivity is even more apparent in FIG. 5 wherein zinc powder is employed as the agent to reduce the amount of detrimental hydrogen within the weld metal from 2.0 ppm to approximately 1.2 ppm (second example). This feature requires a small amount of zinc of approximately 0.08% of the electrode weight. As can be seen, a combination of the material forming the abscissa of FIG. 4 and the material forming the abscissa of FIG. 5 could be used in reducing hydrogen. Less than 0.16% of such an agent is anticipated by the present invention.

Having thus described the invention, he following is claimed:

1. A consumable welding element for arc welding steel comprising a steel sheath surrounding a compacted core containing an agent for reducing the amount of diffusible hydrogen under about 5 ml/100 g in the weld metal, said agent selected from the group consisting of a polymer containing fluorine, elemental zinc, a zinc alloy, and combinations thereof wherein said fluorine polymer is non-hydroscopic and essentially inert and does not contain hydrogen or nitrogen said agent constitutes between about 0.1 to 0.24 weight percent of said element.

2. A welding element as defined in claim 1 wherein said core includes powdered metal alloying materials.

3. A welding element as defined in claim 2 wherein said alloying materials and said steel sheath, taken together, contain carbon of less than about 0.1% of the total element weight.

4. A welding element as defined in claim 3 wherein said alloying materials and said steel sheath, taken together, include at least manganese, silicon, molybdenum, nickel and titanium.

5. A welding element as defined in claim 4 wherein said hydrogen reducing agent is said fluorine polymer.

6. A welding element as defined in claim 5 wherein said fluorine polymer constitutes less than about 0.16 weight percent of said element.

7. A welding element as defined in claim 4 wherein said hydrogen reducing agent is said element zinc and zinc alloys.

8. A welding element as defined in claim 7 wherein said elemental zinc and zinc alloys constituted less than about 0.08 weight percent of said element.

9. A welding element as defined in claim 1 wherein said hydrogen reducing agent is said fluorine polymer.

10. A welding element as defined in claim 9 wherein said fluorine polymer constitutes less than about 0.16 weight percent of said element.

11. A welding element as defined in claim 10 wherein said elemental zinc and zinc alloys constitute less than about 0.08 weight percent of said element.

12. A welding element as defined in claim 1 wherein said hydrogen reducing agent is said element zinc and zinc alloys.

13. A method of making a consumable welding element for high strength steel to reduce the diffusible hydrogen in the weld metal to under about 5 mil/100 g, said method including the steps of:

(a) providing a steel sheath with a central bore;

(b) loading said bore with particles to reduce diffusible hydrogen in the weld metal, said particles, selected from the group consisting of a polymer containing fluorine, elemental zinc powder, a zinc alloy powder and any combinations thereof, said fluorine polymer having non-hydroscopic and essentially inert properties and does not contain hydrogen or nitrogen, said particles constitute between about 0.1 to 0.24 weight percent of said element, and, (c) drawing said sheath into a desired diameter.

14. A method as defined in claim 13 including the step of loading said bore with alloying particles in addition to said hydrogen reducing particles.

15. A method as defined in claim 14 wherein said hydrogen reducing particles are said fluorine polymers.

16. A method as defined in claim 15 wherein said fluorine polymers consist of less than about 0.16 weight percent of said element.

17. A method as defined in claim 14 wherein said hydrogen reducing particles are said elemental zinc and zinc alloys.

18. A method as defined in claim 17 wherein said elemental zinc alloys constitute less than about 0.08 weight percent of said element.

19. A method as defined in claim 13 wherein said hydrogen reducing particles are said fluorine polymers.

20. A method as defined in claim 19 wherein said fluorine polymers consist of less than about 0.16 weight percent of said element.

21. A method as defined in claim 13 wherein said hydrogen reducing particles are said elemental zinc and zinc alloys.

22. A method as defined in claim 21 wherein said elemental zinc and zinc alloys constitute less than about 0.08 weight percent of said element.

* * * * *